(12) United States Patent
Cheah

(10) Patent No.: US 10,280,781 B2
(45) Date of Patent: May 7, 2019

(54) TURBINE SHROUD MILLING

(71) Applicant: Pratt & Whitney Services PTE LTD., Singapore (SG)

(72) Inventor: Kim Wei Cheah, Singapore (SG)

(73) Assignee: Pratt & Whitney Services PTE LTD., Singapore (SG)

(*) Notice: Subject to any disclaimer, the term of this patent is extended or adjusted under 35 U.S.C. 154(b) by 399 days.

(21) Appl. No.: 14/760,216

(22) PCT Filed: Dec. 19, 2013

(86) PCT No.: PCT/SG2013/000543
§ 371 (c)(1),
(2) Date: Jul. 10, 2015

(87) PCT Pub. No.: WO2014/109709
PCT Pub. Date: Jul. 17, 2014

(65) Prior Publication Data
US 2015/0354388 A1    Dec. 10, 2015

(30) Foreign Application Priority Data
Jan. 10, 2013 (SG) .................. 201300218

(51) Int. Cl.
*F01D 11/00* (2006.01)
*B23C 3/00* (2006.01)
(Continued)

(52) U.S. Cl.
CPC .............. *F01D 11/006* (2013.01); *B23C 3/00* (2013.01); *B23Q 3/063* (2013.01); *B23C 2215/44* (2013.01); *B23P 6/007* (2013.01); *F05D 2220/30* (2013.01); *F05D 2230/14* (2013.01); *F05D 2240/55* (2013.01); *Y10T 409/303752* (2015.01)

(58) Field of Classification Search
CPC ......... B23Q 3/063; F01D 11/006; B23C 3/00; F05D 2220/30; F05D 2230/14
See application file for complete search history.

(56) References Cited

U.S. PATENT DOCUMENTS 3,262,368 A    7/1966    Attermeyer et al.
3,568,568 A    3/1971    Mahler
(Continued)

FOREIGN PATENT DOCUMENTS

EP    0237156    9/1987
EP    2286960    2/2011
(Continued)

OTHER PUBLICATIONS

International Search Report and Written Opinion for International Application No. PCT/SG2013/000543 dated Apr. 7, 2014.
(Continued)

*Primary Examiner* — Moshe Wilensky
(74) *Attorney, Agent, or Firm* — Carlson, Gaskey & Olds, P.C.

(57) ABSTRACT

An exemplary shroud milling method includes milling a convex side of a shroud, milling a concave side of the shroud, and holding a shroud within a common fixture when milling the convex side and when milling the concave side.

18 Claims, 4 Drawing Sheets

(51) Int. Cl.
*B23Q 3/06* (2006.01)
*B23P 6/00* (2006.01)

(56) References Cited

U.S. PATENT DOCUMENTS

| | | | |
|---|---|---|---|
| 4,176,433 | A | 12/1979 | Lee et al. |
| 4,285,108 | A | 8/1981 | Arrigoni |
| 4,589,175 | A | 5/1986 | Arrigoni |
| 5,733,080 | A | 3/1998 | David et al. |
| 5,956,845 | A | 9/1999 | Arnold |
| 6,139,412 | A | 10/2000 | Dwyer |
| 6,164,916 | A | 12/2000 | Frost et al. |
| 6,233,822 | B1 | 5/2001 | Grossklaus, Jr. et al. |
| 6,379,528 | B1 | 4/2002 | Lee et al. |
| 6,883,234 | B2 | 4/2005 | Packman et al. |
| 7,509,736 | B2 | 3/2009 | Boudereau et al. |
| 2005/0186045 | A1 | 8/2005 | Killer et al. |
| 2005/0268461 | A1* | 12/2005 | Ouellette .............. B23Q 3/063 29/889.7 |
| 2007/0006475 | A1* | 1/2007 | Couture ................ B23Q 3/063 33/573 |
| 2009/0311416 | A1 | 12/2009 | Nelson et al. |

FOREIGN PATENT DOCUMENTS

| | | |
|---|---|---|
| FR | 2966069 | 4/2012 |
| FR | 2976203 | 12/2012 |
| WO | 2012079637 | 6/2012 |

OTHER PUBLICATIONS

Singapore Examination and Search Report for Singapore Application No. 201300218-3 dated Oct. 15, 2013.
Supplementary European Search Report for Application No. 13871115.5 dated Jun. 30, 2016.

\* cited by examiner

TURBINE SHROUD MILLING

BACKGROUND

This disclosure relates generally to milling and, more particularly, to reducing shroud milling complexity.

Components are often machined to acquire desired dimensions. Both newly-cast and repaired components may be machined. Machining changes the dimensions of the components by removing material.

Machining relatively complex components often requires multiple fixtures and multiple cutters. Machining these relatively complex components often requires significant time. Turbomachine blades, particularly the shrouds of turbomachine blades, are examples of these relatively complex components. For example, machining in particularly grinding turbomachine shrouds may require several fixtures, diamond dressers, and grinding wheels. In-process repositioning the turbomachine blades for grinding may lead to machining errors.

SUMMARY

A shroud milling method according to an exemplary aspect of the present disclosure includes, among other things, milling a convex side of a shroud, milling a concave side of the shroud, and holding a shroud within a common fixture when milling the convex side and when milling the concave side.

In a further non-limiting embodiment of the foregoing method, the method may include milling a knife-edge of the shroud, and holding the shroud within the common fixture when milling the knife-edge of the shroud.

In a further non-limiting embodiment of either of the foregoing methods, the method may include moving a milling cutter relative to the shroud and the common fixture during the milling.

In a further non-limiting embodiment of any of the foregoing methods, milling the convex side may comprise milling a notch radius within the convex side.

In a further non-limiting embodiment of any of the foregoing methods, a common milling cutter may mill the convex side and the notch radius.

In a further non-limiting embodiment of any of the foregoing methods, milling the convex side may comprise side milling and end milling. The end milling may establish the notch radius.

In a further non-limiting embodiment of any of the foregoing methods, a common milling cutter may mill the convex side and the concave side.

In a further non-limiting embodiment of any of the foregoing methods, the shroud may be a turbine shroud of a newly-cast blade.

In a further non-limiting embodiment of any of the foregoing methods, the milling may include removing at least some weldment from the shroud.

A shroud according to an exemplary aspect of the present disclosure includes, among other things, a concave side of a shroud, a convex side of the shroud, and a knife-edge seal of the shroud. The concave side, the convex side, and the knife-edge seal are cut using an end mill cutter.

In a further non-limiting embodiment of the foregoing shroud, the concave side, the convex side, and the knife-edge seal may be held within a common fixture when cut using the end mill cutter.

In a further non-limiting embodiment of the foregoing shroud, the shroud may be a shroud of a turbine blade of a turbomachine.

In a further non-limiting embodiment of the foregoing shroud, the concave side may comprise a notch radius established by end milling.

In a further non-limiting embodiment of the foregoing shroud, the notch radius may be cut using the end mill cutter.

In a further non-limiting embodiment of the foregoing shroud, the knife edge seal may comprise at least two separate knife edge seals.

A method of milling a turbine blade shroud according to an exemplary aspect of the present disclosure includes, among other things securing a turbine blade within a fixture, milling a concave side of a turbine blade shroud while the turbine blade is secured within the fixture, and milling a convex side of the turbine blade shroud while the turbine blade is secured within the fixture.

In a further non-limiting embodiment of the foregoing method, the method may include milling a knife-edge seal of the turbine blade shroud while the turbine blade is secured within the fixture.

In a further non-limiting embodiment of either of the foregoing methods, the turbine blade may not be removed from the fixture during the milling.

In a further non-limiting embodiment of any of the foregoing methods, the method may include end milling a notch radius when milling the concave side of the turbine blade shroud.

In a further non-limiting embodiment of any of the foregoing methods, the method may include using the same milling cutter for milling the concave side and for milling the convex side.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
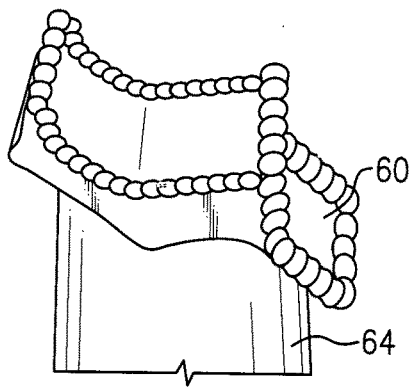
FIG. 1 shows a shroud of a repaired blade from a turbine section of a turbomachine.

Referring to FIG. 1, a shroud 60 of a blade 64 from a high-pressure turbine of a turbomachine engine is shown during a repair. In this example, the shroud 60 was significantly worn during use and required repair. The initial repairs involved building up weldment in the worn areas of the shroud 60. As will be shown, the shroud 60 is then machined to desired dimensions. The shroud 60 is reinstalled within the engine after machining.

The techniques of this disclosure are described with reference to the shroud 60, which is a repaired shroud 60. The techniques of this disclosure could also apply to machining shrouds of newly-cast blades to desired dimensions. That is, this disclosure is not limited to machining repaired blades.

Figure 2:
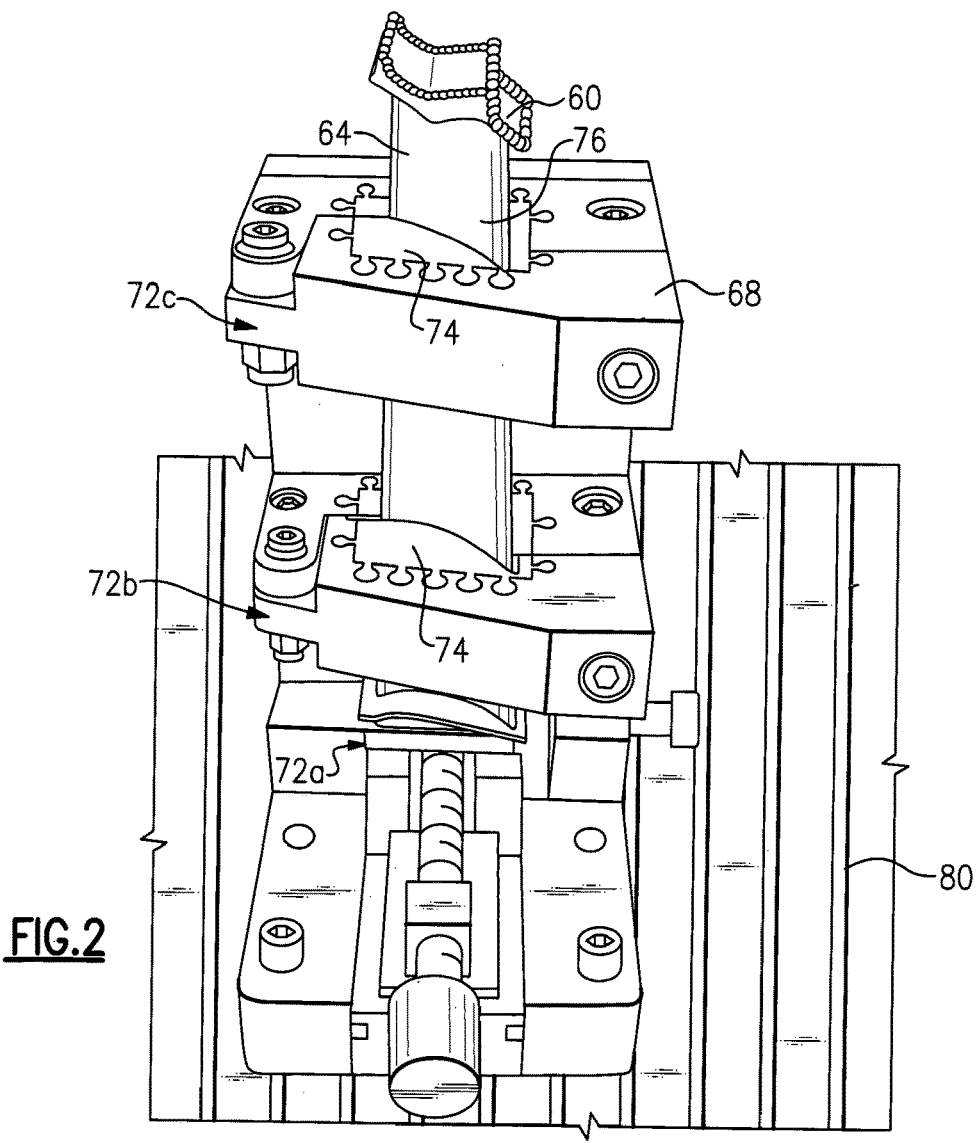
FIG. 2 shows the blade of FIG. 1 within a fixture.
Figure 3:
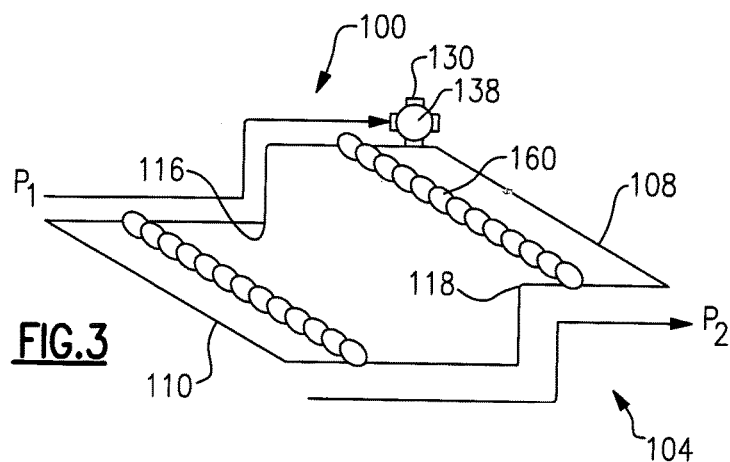
FIG. 3 shows a step in a method of milling the shroud of FIG. 1.
Figure 4:
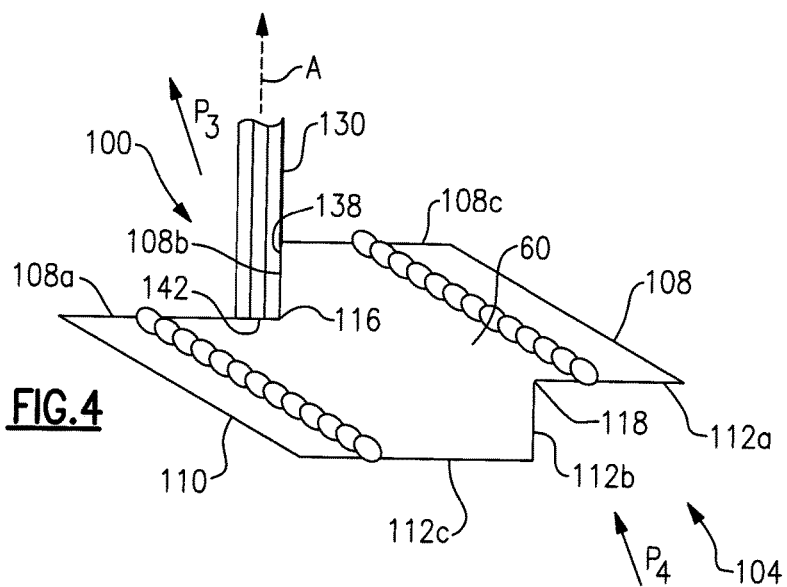
FIG. 4 shows another step in the method of milling the shroud of FIG. 1.
Figure 5:
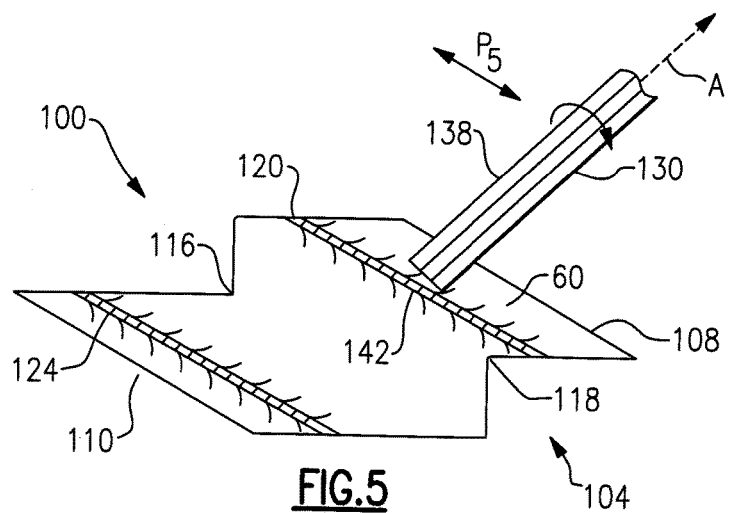
FIG. 5 shows yet another step in the method of milling the shroud of FIG. 1.
Figure 6:
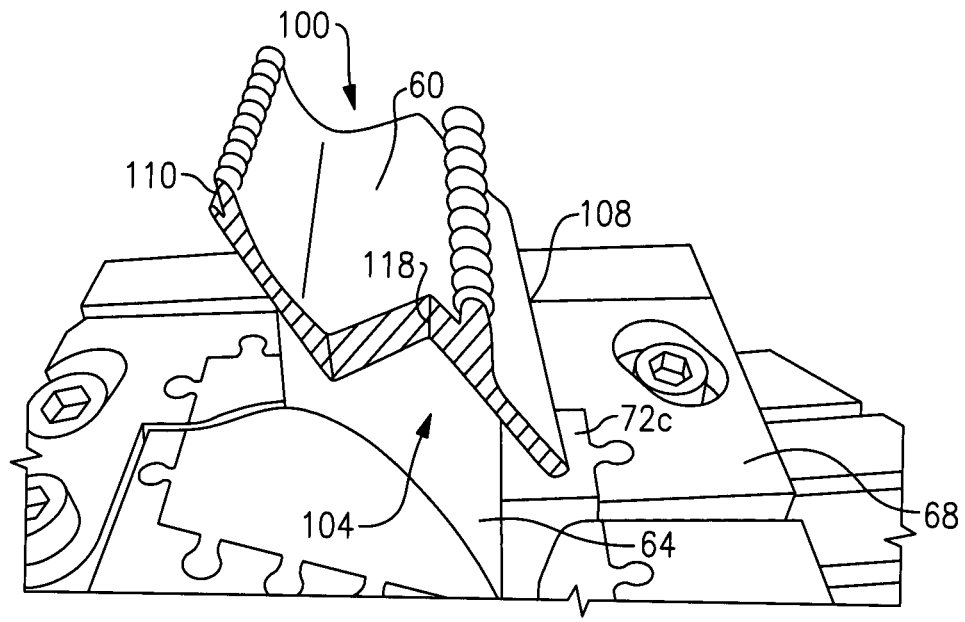
FIG. 6 shows the shroud of FIG. 1 after the step of FIG. 3.
Figure 7:
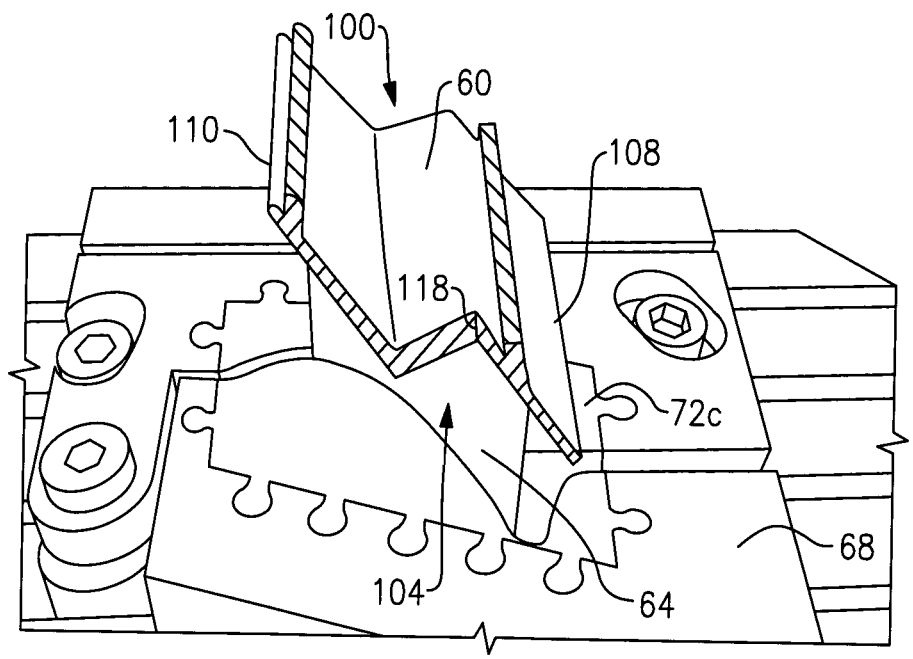
FIG. 7 shows the shroud of FIG. 1 after the step of FIG. 5.

Referring now to FIG. 2, machining the shroud 60 involves placing the blade 64 within a fixture 68. The example fixture 68 includes three clamps 72a-72c. In this example, the clamp 72a is used to secure a root of the blade 64. The root held by the clamp 72a may provide a reference datum when machining the shroud 60. The clamps 72b and 72c directly contact an airfoil portion 76 of the blade 64. The clamps 72b and 72c may include a thermoset compound resin portion 74 that directly contacts the airfoil portion 76. The portions 74 dampen vibrations of the blade 64 during machining.

Milling is the machining process used, in this example, to shape the shroud 60 into the desired dimensions. Thus, after securing the blade 64 within the fixture 68, the blade 64 and the fixture 68 are secured to a milling table 80. In this example, the blade 64 is held by the fixture 68 during the entire shroud milling process.

Referring now to FIGS. 3-7, the shroud 60 includes a convex side 100 and a concave side 104. The convex side 100 and the concave side 104 each extend from a leading edge 108 of the shroud 60 to a trailing edge 110 of the shroud 60. The convex side 100 includes a notch radius 116. The concave side 104 includes a notch radius 118. The convex side 100 and the concave side 104 interface directly with circumferentially adjacent shrouds when installed within the engine.

In this example, the convex side 100 includes three distinct planar surfaces 108a-108c. The concave side 104 also includes three distinct planar surfaces 112a-112c.

In this example, a first knife-edge seal 120 and a second knife-edge seal 124 extend radially from the blade 64. As is known, the knife-edge seals 120 and 124 contact a blade outer air seal within the engine (FIG. 1) to provide a sealing interface.

In this example, an end mill cutter 130 mills the shroud 60 to provide the convex side 100, the concave side 104, the notch radii 116 and 118, and the knife-edge seals 120 and 124. Notably, because the shroud 60 is milled while held within the fixture 68, the shroud 60 is milled using a "common" fixture and a "common" end mill cutter. In the prior art, blades may be removed and reinstalled in several different fixtures when grinding a shroud.

The end mill cutter 130 rotates about an axis A during milling. When milling the convex side 100 and the concave side 104, cutting blades on the sides 138 of the end mill cutter 130 are used. When milling the notch radii 116 and 118, cutting blades on the sides 138 and end 142 of the end mill cutter 130 are used. When milling the knife-edge seals 120 and 124, the sides 138 of the end mill cutter 130 are used.

When milling the convex side 100 and the concave side 104, the end mill cutter 130 travels along paths $P_1$ and $P_2$, respectively. The mill cutter 130 generally changes directions twice when moving along the paths $P_1$ to cut the surfaces 108a-108c. The mill cutter 130 generally changes directions twice when moving along the paths $P_1$ to cut the surfaces 112a-112c.

The notch radius 116 is the interface between the surface 108a and the surface 108b. The notch radius 118 is the interface between the surface 112a and the surface 112b. When milling the notch radii 116 and 118, the end mill cutter 130 moves along paths along $P_3$ and $P_4$, respectively. The paths $P_3$ and $P_4$ extend in radial directions (and outward from the page in FIG. 4). Because cutting surfaces on the sides 138 and the end 142 of the end mill cutter 130 are used, material can be simultaneously removed from the two surfaces that meet to form the notch radius 116 or the notch radius 118.

When milling the knife-edge seals 124 and 120, the end mill cutter 130 travels generally along the path $P_5$, which requires the end mill cutter 130 to move radially in and out as well as circumferentially across a radially outward facing surface of the shroud 60.

Figure 8:
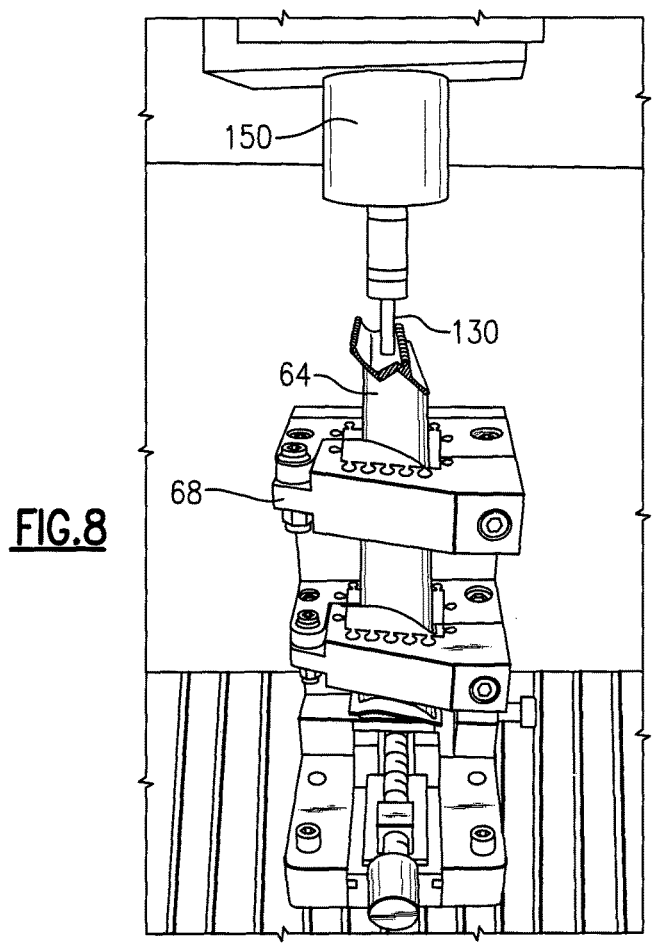
FIG. 8 shows the shroud of the FIG. 1 within a milling cutter assembly during the step of FIG. 4.
Figure 9:
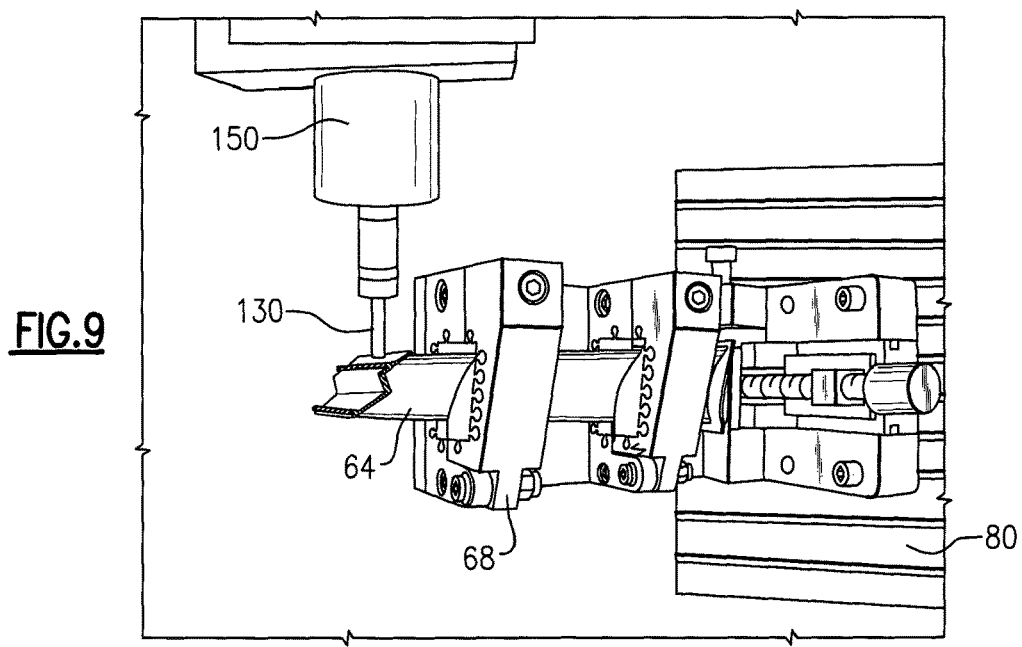
FIG. 9 shows the shroud of FIG. 1 within the milling cutter assembly during the step of FIG. 5.

Referring to FIGS. 8 and 9, the end mill cutter 130 is controlled by a positioner 150. A controller (not shown) may include an input device utilized to program movements of the position 150, and thus the end mill cutter 150.

To move the end mill cutter 130 along the paths along $P_1$-$P_5$ the shroud 60 may be moved, the end mill cutter 130 may be moved, or some combination of the shroud 60 and the end mill cutter 130 may be moved.

FIG. 8 shows the shroud 60 held by fixture 168 in a position suitable for milling the convex side 100 and the concave side 104. FIG. 9 shows the table 80 rotated 90° to a position suitable for moving the end mill cutter 130 along the path $P_5$. The amount the table 80 is rotated may vary depending on design requirements. That is, 90° is only an example amount of rotation.

Features of the disclosed examples include encapsulating shroud milling processes into a process utilizing a single or common fixture moving a shroud relative to a common milling cutter. The process of this disclosure replaces multiple fixtures, diamond dressers, and grinding wheels used in standard shroud milling processes.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A method of milling a shroud of a turbine blade, comprising:
   milling a convex side of the shroud, wherein the convex side of the shroud is on a convex side of the turbine blade, and the convex side of the shroud is an outermost convex side surface of the shroud;
   milling a concave side of the shroud, wherein the concave side of the shroud is on a concave side of the turbine blade, and the concave side of the shroud is an outermost concave side surface of the shroud;
   holding the shroud of the turbine blade within a common fixture when milling the convex side of the shroud, and when milling the concave side of the shroud, wherein the holding includes a clamping force applied to the turbine blade; and
   milling the convex side of the shroud from a leading edge of the shroud all the way to a trailing edge of the shroud, and milling the concave side of the shroud from the leading edge of the shroud all the way to the trailing edge of the shroud.

2. The method of claim 1, further comprising milling a knife-edge of the shroud, and holding the shroud within the common fixture when milling the knife-edge of the shroud.

3. The method of claim 1, wherein the turbine blade extends along an axis, and the clamping force is applied to the turbine blade transverse to the axis.

4. The method of claim 1, wherein the clamping force is applied by a clamp directly contacting an airfoil of the turbine blade.

5. The method of claim 1, wherein the concave side of the shroud and the convex side of the shroud are circumferentially facing side surfaces and are configured to interface directly with circumferentially adjacent shrouds within a turbomachine engine from the leading edge to the trailing edge.

6. The method of claim 3, wherein milled surfaces of the concave side of the shroud, milled surfaces the convex side of the shroud, the leading edge, and the trailing edge define an entire outermost perimeter of the shroud relative to the axis.

7. The method of claim 2, wherein the knife-edge extends from the concave side of the shroud to the convex side of the shroud.

8. The method of claim 2, further comprising rotating the common fixture to reposition the shroud after milling the concave side of the shroud and before milling the knife-edge.

9. A method of milling a shroud of a turbine blade, comprising:
   securing the turbine blade within a fixture by applying a clamping force to an airfoil portion of the turbine blade, the force applied in a direction transverse to an axis of the turbine blade;
   milling a concave side of a shroud while the turbine blade is secured within the fixture;
   milling a convex side of the shroud while the turbine blade is secured within the fixture, wherein the convex side of the shroud is a circumferentially outermost surface of the shroud on the convex side of the turbine blade, and the concave side of the shroud is a circumferentially outermost surface of the shroud on the concave side of the turbine blade; and
   milling the circumferentially outermost surface of the shroud on the convex side of the turbine blade from a leading edge of the shroud all the way to a trailing edge of the shroud, and milling the circumferentially outermost surface of the shroud on the concave side of the shroud from the leading edge of the shroud all the way to the trailing edge of the shroud.

10. The method of claim 9, including milling a knife-edge seal of the shroud while the turbine blade is secured within the fixture.

11. The method of claim 9, wherein milled surfaces of the concave side of the shroud and milled surfaces the convex side of the shroud are each configured to interface directly with an adjacent shroud within a turbomachine engine along an entire length of the respective concave or convex side that extends from a leading edge of the shroud to a trailing edge of the shroud.

12. The method of claim 9, wherein the clamping force is applied by a clamp that directly contacts the airfoil portion of the turbine blade.

13. The method of claim 9, wherein the concave side of the shroud and the convex side of the shroud each extend from a leading edge of the shroud to a trailing edge of the shroud, wherein the concave side of the shroud and the convex side of the shroud are configured to interface directly with a circumferentially adjacent shroud within a turbomachine engine along an entire length of the respective concave or convex side that extends from the leading edge to the trailing edge, wherein the concave side of the shroud, the convex side of the shroud, the leading edge, and the trailing edge define an entire outermost perimeter of the shroud relative to the axis of the turbine blade.

14. The method of claim 9, further comprising milling a knife-edge of the shroud while the turbine blade is secured within the fixture.

15. The method of claim 14, wherein the knife-edge extends from the concave side of the shroud to the convex side of the shroud.

16. The method of claim 15, further comprising rotating the fixture to reposition the turbine blade after milling the concave side of the shroud and before milling the knife-edge.

17. A method of milling a shroud of a turbine blade, comprising:
   securing the turbine blade within a fixture by applying a clamping force to an airfoil portion of the turbine blade, the force applied in a direction transverse to an axis of the turbine blade;
   milling a first circumferentially facing side surface of a shroud from a leading edge of the shroud all the way to a trailing edge of the shroud while the turbine blade is secured within the fixture; and
   milling an opposite, second circumferentially facing side surface of the shroud from the leading edge of the shroud all the way to the trailing edge of the shroud while the turbine blade is secured within the fixture, wherein the first and second side surfaces of the shroud are outermost circumferentially facing side surfaces of the shroud relative to the axis when the shroud is within a turbomachine engine, and the first and second side surfaces are configured to interface directly with respective adjacent shrouds within the turbomachine engine.

18. The method of claim 17, further comprising, milling a knife-edge of the shroud while continuing to hold the turbine blade within the fixture, the knife-edge extending from the first to the second side.

* * * * *